(12) United States Patent
Taniguchi

(10) Patent No.: US 11,548,508 B2
(45) Date of Patent: Jan. 10, 2023

(54) DRIVING ASSIST METHOD AND DRIVING ASSIST DEVICE

(71) Applicant: Nissan Motor Co., Ltd., Yokohama (JP)

(72) Inventor: Yohei Taniguchi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 54 days.

(21) Appl. No.: 15/734,285

(22) PCT Filed: Jun. 26, 2018

(86) PCT No.: PCT/JP2018/024093
§ 371 (c)(1),
(2) Date: Dec. 2, 2020

(87) PCT Pub. No.: WO2020/003366
PCT Pub. Date: Jan. 2, 2020

(65) Prior Publication Data
US 2021/0155242 A1    May 27, 2021

(51) Int. Cl.
*B60W 10/04*    (2006.01)
*B60W 10/18*    (2012.01)
(Continued)

(52) U.S. Cl.
CPC .. *B60W 30/18163* (2013.01); *B60W 50/0098* (2013.01); *B60W 50/14* (2013.01);
(Continued)

(58) Field of Classification Search
CPC ....... B60W 30/18163; B60W 50/0098; B60W 50/14; B60W 1/167; B60W 10/04;
(Continued)

(56) References Cited

U.S. PATENT DOCUMENTS

2015/0360684 A1* 12/2015 Matsuno ......... B60W 30/18163
701/23
2016/0214612 A1* 7/2016 Kashiba ............. B60W 10/184
(Continued)

FOREIGN PATENT DOCUMENTS

JP    2009301132 A  * 12/2009
JP    2015-184721 A   10/2015

*Primary Examiner* — Abby Y Lin
*Assistant Examiner* — Hossam M Abd El Latif
(74) *Attorney, Agent, or Firm* — Global IP Counselors, LLP

(57) ABSTRACT

A driving assist method is performed by a controller that performs a lane change assist based on a generated target route. A determination is made as to whether or not the lane change has been executed. Next, it determines whether or not the lane change is in a direction toward a preset location due to a driver's operation when the lane change has been executed. Then, a determination is made as to whether or not a position index value from the host vehicle to the preset location is equal to or less than a first threshold value when the lane change is in a direction toward the preset location due to the driver's operation. The lane change assist in a direction away from the preset location is restricted when the position index value is equal to or less than the first threshold value.

4 Claims, 7 Drawing Sheets

(51) Int. Cl.
   *B60W 10/20* (2006.01)
   *B60W 30/10* (2006.01)
   *B60W 30/12* (2020.01)
   *B60W 30/14* (2006.01)
   *B60W 30/18* (2012.01)
   *B60W 40/08* (2012.01)
   *B60W 50/00* (2006.01)
   *B60W 50/10* (2012.01)
   *B60W 50/14* (2020.01)
   *B60W 60/00* (2020.01)
   *B62D 6/00* (2006.01)
   *G08G 1/16* (2006.01)

(52) U.S. Cl.
   CPC ............ *G08G 1/167* (2013.01); *B60W 10/04* (2013.01); *B60W 10/18* (2013.01); *B60W 10/20* (2013.01); *B60W 2420/42* (2013.01); *B60W 2420/52* (2013.01); *B60W 2710/18* (2013.01); *B60W 2710/20* (2013.01)

(58) Field of Classification Search
   CPC .. B60W 10/18; B60W 10/20; B60W 2420/42; B60W 2420/52; B60W 2710/18; B60W 2710/20; B60W 2540/215; B60W 2556/50; B60W 40/08; B60W 50/10; B60W 60/001; B60W 30/10; B60W 30/12; B60W 30/14; B60W 30/18; B62D 6/00; G08G 1/08; G08G 1/16; G01S 13/867; G01S 2013/932; G01S 2013/9322; G01S 2013/9323; G01S 2013/9324; G01S 2013/93271; G01S 2013/93272; G01S 2013/93274
   See application file for complete search history.

(56) References Cited

U.S. PATENT DOCUMENTS

| | | | |
|---|---|---|---|
| 2018/0033309 A1* | 2/2018 | Norwood | B62D 15/029 |
| 2019/0100211 A1* | 4/2019 | Liu | B60W 10/20 |
| 2019/0202457 A1* | 7/2019 | Kito | B60W 30/162 |

* cited by examiner

DRIVING ASSIST METHOD AND DRIVING ASSIST DEVICE

CROSS-REFERENCE TO RELATED APPLICATIONS

This application is a U.S. national stage application of International Application No. PCT/JP2018/024093, filed on Jun. 26, 2018.

TECHNICAL FIELD

The present invention relates to a driving assist method and a driving assist device.

BACKGROUND INFORMATION

In the prior art, there have been driving assist methods in which, when it has been determined that a lane change will be made at a guidance branching location ahead of a host vehicle and it is then determined that the host vehicle is traveling on a road where a lane-change-prohibiting line is present, a lane-change-starting location where the host vehicle will start a lane change is set at a final end of the lane-change-prohibiting line in a direction in which the host vehicle advances (for example, see Japanese Laid-Open Patent Application No. 2015-184721-Patent Document 1). With this driving assist method, when the host vehicle is determined to have arrived at the lane-change-starting location, an engine device, a brake device, power steering, etc., are propellably controlled to automatically perform a lane change.

SUMMARY

In a prior-art driving assist method, a lane-change-starting location is set at a final end of a lane-change-prohibiting line, and the host vehicle is therefore able to travel according to traffic rules on the basis of a lane classification. However, a driver's intention is not taken into consideration in an automatic lane change (an autonomous lane change) performed when the host vehicle is determined to have arrived at the lane-change-starting location. Therefore, there is a possibility that an autonomous lane change or another form of a lane change assist that is not compliant with the driver's intention will be performed.

The present disclosure was contrived in view of the problems described above, it being an object of the present disclosure to provide a driving assist method and a driving assist device with which a lane change assist opposing the driver's intention can be prevented from being performed.

To achieve the object described above, the present disclosure is a driving assist method used when a target route is generated and a controller executes driving assist control in which a lane change assist is performed to assist a lane change based on the target route.

In this driving assist method, a determination is made as to whether or not a lane change has been executed, and upon determining that a lane change has been executed, a determination is made as to whether or not the lane change was in a direction approaching a set location due to a driver's operation. When the lane change is assessed to be in a direction approaching a set location due to the driver's operation, a determination is made as to whether or not a position index value from a host vehicle to the set location is equal to or less than a first threshold value.

When the position index value is assessed to be equal to or less than the first threshold value, a lane change assist in a direction away from the set location is restricted.

Consequently, in the present disclosure, a lane change assist opposing the driver's intention can be prevented from being performed.

BRIEF DESCRIPTION OF THE DRAWINGS

Referring now to the attached drawings which form a part of this original disclosure.

DETAILED DESCRIPTION OF EMBODIMENTS

Figure 1:
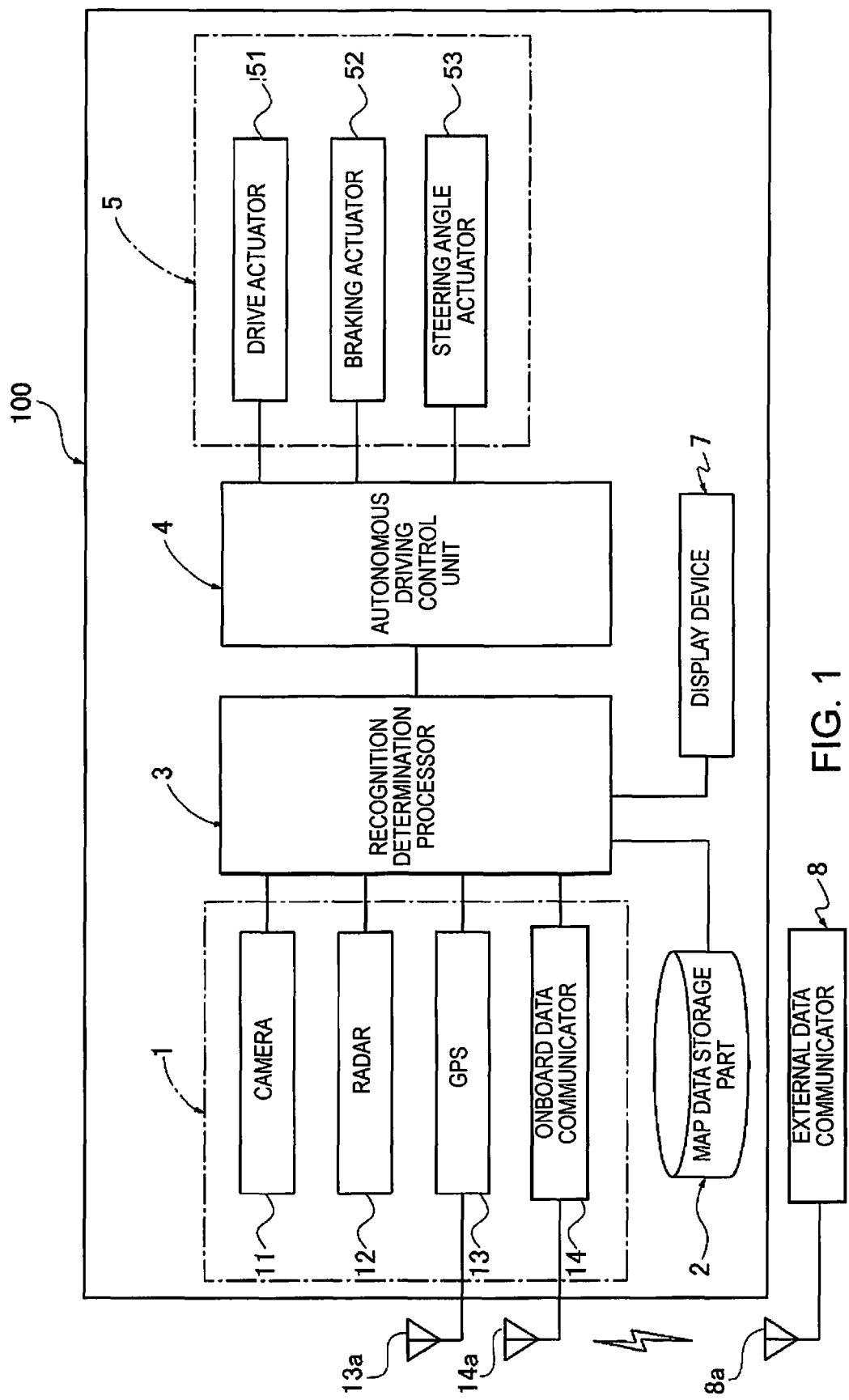
FIG. 1 is an overall system diagram of an autonomous driving control system to which a driving assist method and a driving assist device have been applied to a first embodiment.

An embodiment of a driving assist method and a driving assist device according to the present disclosure is described below on the basis of a first embodiment shown in the drawings.

First Embodiment

The driving assist method and the driving assist device in the first embodiment are applied to an autonomously driven vehicle (one example of a drive-assisted vehicle; a host vehicle) in which target route information generated by a recognition determination processor is used and when an autonomous driving mode is selected, driving, braking, and steering are autonomously controlled. A description of a configuration of the first embodiment is divided below into sections "Overall System Configuration," "Control Block Configuration of Recognition Determination Processor," "Process Configuration Of Driving assist Control," "Process Configuration of First Lane Change Control," "Process Configuration of Second Lane Change Control," And "Process Configuration of Autonomous Lane Change Allowance Control."

Overall System Configuration

An autonomous driving system 100 is provided with an onboard sensor 1, a map data storage part 2, a recognition determination processor 3 (controller), an autonomous driving control unit 4, an actuator 5, and a display device 7, as shown in FIG. 1.

The onboard sensor 1 has a camera 11, a radar 12, a GPS 13, and an onboard data communicator 14. Though not shown, a vehicle speed sensor, an accelerator position sensor, a brake sensor, a steering angle sensor, and other sensors that detect host vehicle information are included in the onboard sensor 1. Sensor information acquired by the onboard sensor 1 is outputted to the recognition determination processor 3.

The camera 11 is a surroundings recognition sensor that carries out a function of acquiring host vehicle surroundings information such as lanes, preceding vehicles, and pedestrians from image data, as a function needed for autonomous driving. The camera 11 is configured by combining, for example, a host vehicle forward recognition camera, a rearward recognition camera, a rightward recognition camera, a leftward recognition camera, etc.

Objects on the host vehicle travel roadway, lanes, objects outside of the host vehicle travel roadway (road structures, preceding vehicles, succeeding vehicles, oncoming vehicles, surrounding vehicles, pedestrians, bicycles, motorcycles), the host vehicle travel roadway (white road lines, road borders, stop lines, crosswalks), road signs (speed limits), etc., are sensed by the camera 11.

The radar 12 is a distance measurement sensor that carries out a function of sensing the presence of objects in the surroundings of the host vehicle and the function of sensing distances to objects in the surroundings of the host vehicle, as functions needed for autonomous driving. "Radar 12" in this example is a general term including radar using radio waves, lidar using light, and sonar using ultrasonic waves. For example, laser radar, milliwave radar, ultrasonic radar, a laser range finder, etc., can be used as the radar 12. The radar 12 is configured by combining, for example, host vehicle forward radar, rearward radar, rightward radar, leftward radar, etc.

Positions of objects on the host vehicle travel roadway, objects outside of the host vehicle travel roadway (road structures, preceding vehicles, succeeding vehicles, oncoming vehicles, surrounding vehicles, pedestrians, bicycles, motorcycles), etc., are sensed and distances to the objects are sensed by the radar 12. If a viewing angle is insufficient, viewing angle can be added as appropriate.

The GPS 13 is a host vehicle position sensor that has a GNSS antenna 13*a* and uses satellite communication to sense the host vehicle position (latitude and longitude) while the host vehicle is stopped or traveling. "GNSS" is an abbreviation of "Global Navigation Satellite System," and "GPS" is an abbreviation of "Global Positioning System."

The onboard data communicator 14 is an external data sensor that wirelessly communicates with an external data communicator 8 via transceiver antennas 8*a*, 14*a*, and thereby acquires, from an external source, information that cannot be acquired from the host vehicle.

In cases where the external data communicator 8 is, for example, a data communicator installed in another vehicle traveling in the vicinity of the host vehicle, the onboard data communicator 14 performs vehicle-to-vehicle communication between the host vehicle and the other vehicle. The onboard data communicator 14 can, by self-initiated request, acquire information necessary to the host vehicle from among a variety of information held in the other vehicle, the acquisition being performed via the vehicle-to-vehicle communication.

In cases where the external data communicator 8 is, for example, a data communicator provided to infrastructure equipment, the onboard data communicator 14 performs vehicle-to-infrastructure communication between the host vehicle and the infrastructure equipment. The onboard data communicator 14 can, by self-initiated request, acquire information necessary to the host vehicle from among a variety of information held in the infrastructure equipment, the acquisition being performed via the vehicle-to-infrastructure communication. Thus, in cases where the held information has, e.g., information that map data saved in the map data storage part 2 lacks, or information changed from that in the map data, it is possible for the lacking information/changed information to be supplementarily provided. It is also possible to acquire congestion information, travel restriction information, and other traffic information on a target route on which the host vehicle is intended to travel.

The map data storage unit 2 is configured from an onboard memory that contains "electronic map data," in which map information and latitude/longitude are associated. The electronic map data includes high-precision three-dimensional map data (a dynamic map) for use in an autonomous travel system. When the recognition determination processor 3 recognizes the host vehicle position detected by the GPS 13 as host vehicle information, the map data storage part 2 transmits map data centered around the host vehicle position to the recognition determination processor 3.

The map data has road information associated with individual locations, the road information being defined by nodes and links that connect the nodes. The road information includes: information that specifies the road according to the position/area of the road; and information pertaining to road classification for each road, a road width for each road, and a road shape. The road information is stored, for each item of identification information pertaining to the road links, in association with other information relating to intersections, such as the position of an intersection, an entry direction of the intersection, and a classification of the intersection. Additionally, the road information is stored, for each item of identification information pertaining to the road links, in association with other information relating to roads, such as road classification, road width, road shape, possibility of advancing straight, relationship of advancing priority, possibility of passing (possibility of entering an adjacent lane), speed limit, and road signs.

The recognition determination processor 3 collectively processes input information (host vehicle information, host vehicle position information, host vehicle surroundings information, map data information, destination information, etc.) from the onboard sensor 1 and the map data storage part 2, and generates a target route (travel route), a target vehicle speed profile (including an acceleration profile and a deceleration profile), etc. The generated target route information and target vehicle speed profile information are outputted along with the host vehicle information, etc., to the autonomous driving control unit 4. Specifically, the recognition determination processor 3 executes driving assist control by generating a target route from a current location to a destination on the basis of, inter alia, a route search technique and the route information from the map data storage part 2, and generating a target vehicle speed profile, etc., on the basis of the generated target route. In the recognition determination processor 3, when a determination is made that autonomous driving cannot be maintained according to the results of the host vehicle surroundings being sensed by the onboard sensor 1 while the host vehicle has stopped or is traveling along the target route, the target route, the target vehicle speed profile, etc., are successively corrected on the basis of the sensing results for the host vehicle surroundings. The target route is referred to as the target route even upon having been corrected. Specifically, the target route also includes a corrected route.

Furthermore, driving assist control for performing a lane change assist is executed in the recognition determination processor 3. "A lane change assist" is the assisting of a lane change needed in order to cause the host vehicle to travel on the basis of the generated target route. In this embodiment, "a lane change assist" is an autonomous lane change in which the lane is changed autonomously on the basis of a lane change request outputted due to a predetermined lane change condition being satisfied. Specifically, when a lane change is executed in the host vehicle, the recognition determination processor 3 determines whether an autonomous lane change is possible on the basis of the host vehicle information, the target route information, etc., and outputs a lane change control signal. In the recognition determination processor 3, lane change control for determining whether a lane change is needed is performed on the basis of the host vehicle information and the host vehicle surroundings information, and a lane change request is outputted. Furthermore, the recognition determination processor 3 performs autonomous lane change allowance control for ultimately determining whether to allow an autonomous lane change on the basis of the lane change control signal, etc., and generates an autonomous lane change execution signal upon making the determination to execute an autonomous lane change. The autonomous lane change execution signal is outputted to the autonomous driving control unit 4 (see FIG. 2).

When a determination is made, concerning a post-change lane, that "the post-change lane is not a first lane but a lane return is possible until arrival at the set location" during the process of driving assist control, the recognition determination processor 3 outputs a result of this lane determination. The lane determination result is outputted to the display device 7. The "post-change lane" is a lane in which the host vehicle is traveling after the lane change execution. The "first lane" is a lane in which travel along the target route can be continued.

On the basis of the input information from the recognition determination processor 3, the autonomous driving control unit 4 calculates a drive command value, braking command value, or steering angle command value for causing the host vehicle to travel or stop under autonomous driving along the target route or target lane. In the autonomous driving control unit 4, when the autonomous lane change execution signal is inputted, a drive command value, braking command value, or steering angle command value for causing the host vehicle to change lanes under autonomous driving is calculated. A drive command value calculation result is outputted to a drive actuator 51, a braking command value calculation result is outputted to a braking actuator 52, and a steering angle command value calculation result is outputted to a steering angle actuator 53.

The actuator 5 is a control actuator that causes the host vehicle to travel or stop so as to conform to the target route or target lane on the basis of the control command inputted from the autonomous driving control unit 4, or causes the host vehicle to travel toward a set entrance position. The actuator 5 has the drive actuator 51, the braking actuator 52, and the steering angle actuator 53.

The drive actuator 51 is an actuator that receives input of a drive command value from the autonomous driving control unit 4 and controls a drive force outputted to drive wheels. As the drive actuator 51, for example, an engine is used in the case of an engine vehicle, an engine and a motor-generator (force travel) are used in the case of a hybrid vehicle, and a motor-generator (force travel) is used in the case of an electric automobile.

The braking actuator 52 is an actuator that receives input of a braking command value from the autonomous driving control unit 4 and controls braking force outputted to the drive wheels. For example, a hydraulic booster, an electric booster, a brake fluid pressure actuator, a brake motor actuator, a motor-generator (regenerative), etc., is used as the braking actuator 52.

The steering angle actuator 53 is an actuator that receives input of a steering angle command value from the autonomous driving control unit 4 and controls the steering angle of steered wheels. A turning motor, etc., provided to a steering force transmission system of a steering system is used as the steering angle actuator 53.

The display device 7 is a device that displays a screen image pertaining to, inter alia, where on a map the host vehicle is moving while the host vehicle is stopped or traveling under autonomous driving, and provides visual information pertaining to the host vehicle position to a driver and/or a passenger. The display device 7 receives input of the target route information, the host vehicle information, the destination information, etc., generated by the recognition determination processor 3, and displays a map, roads, the target route, the host vehicle position, the destination, etc., in an easily visually recognizable manner on a display screen.

The display device 7 displays information prompting the driver to return to the first lane (lane-return-encouraging information) when a lane determination result indicating that "the post-change lane is not the first lane but a lane return is possible until arrival at the set location" is inputted from the recognition determination processor 3. The term "lane return" means to perform another lane change from a B lane to an A lane after having changed lanes from the A lane to the B lane; to return to the lane (the A lane) that the host vehicle had been traveling in before the first lane change was performed. In other words, the term "a lane return to the first lane" is the changing of lanes from the post-change lane to the first lane. It is thereby possible to return to a lane in which travel along the target route can be continued (the first lane). Additionally, the "lane-return-encouraging information" is information shown on the display screen of the display device 7, e.g., a character string having the meaning of prompting a lane return, or an arrow indicating the target lane.

Control Block Configuration of Recognition Determination Processor

Figure 2:
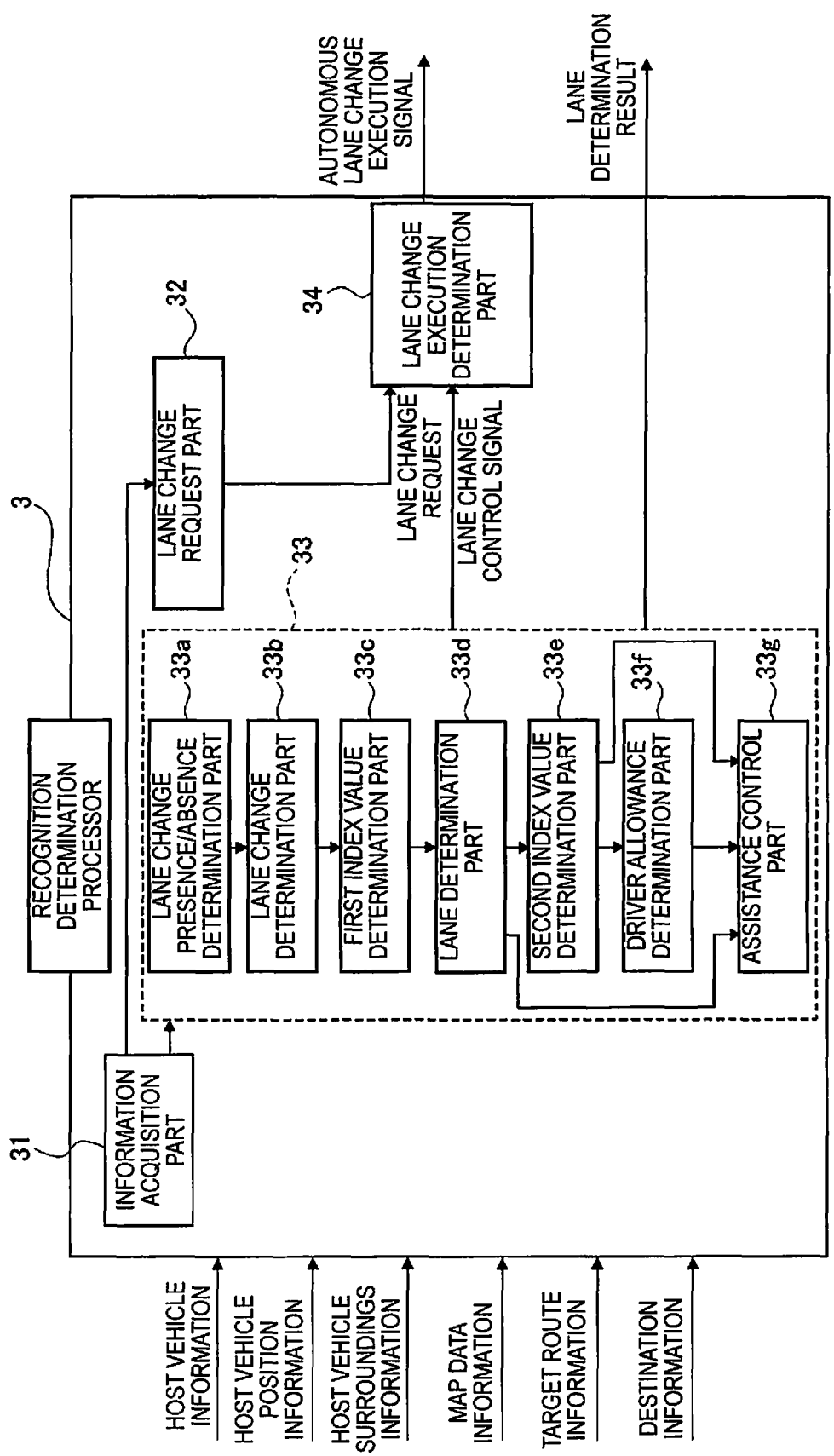
FIG. 2 is a control block diagram of a recognition determination processor of the first embodiment.

The recognition determination processor 3 is provided with an information acquisition part 31, a lane change request part 32, a lane change control part 33, and a lane change execution determination part 34, as shown in FIG. 2.

The information acquisition part 31 receives input of the host vehicle information, the host vehicle surroundings information, the map data information, the target route information, etc. In the information acquisition part 31, necessary information is selected and acquired on the basis of the various inputted information. The variety of information acquired by the information acquisition part 31 is outputted, as appropriate, to the lane change request part 32 and the lane change control part 33.

The lane change request part 32 determines whether or not an autonomous lane change requirement has been satisfied on the basis of the necessary information inputted from the information acquisition part 31, and, upon having assessed that the autonomous lane change requirement has been satisfied, executes lane change control in which a lane change request is outputted. The lane change request outputted from the lane change request part 32 is inputted to the lane change execution determination part 34. In this embodiment, a requirement based on the target route and a requirement based on the presence of a preceding vehicle are examples of autonomous lane change requirements.

Specifically, in the lane change request part 32, host vehicle information, map data information, and target route information are inputted from the information acquisition part 31, and a target lane satisfying a given travel condition is set while the host vehicle is caused to travel along the target route. The host vehicle lane and the target lane are then compared to assess whether or not the two are the same lane. When the host vehicle lane and the target lane are not the same lane, it is deemed that the autonomous lane change requirement has been satisfied and a lane change request is outputted, which requests execution of a lane change toward the target lane.

In the lane change request part 32, the host vehicle information and the host vehicle surroundings information are inputted from the information acquisition part 31, and a determination is made as to whether or not a preceding vehicle is present in the host vehicle lane. When a preceding vehicle is present, a determination is made as to whether or not a condition for passing the preceding vehicle has been fulfilled. When the passing condition has been fulfilled, it is deemed that the autonomous lane change requirement has been satisfied and a lane change request is outputted, which requests execution of a lane change passing the preceding vehicle. The "passing condition" is a condition by which passing the preceding vehicle is assessed to be possible on the basis of, inter alia, a distance and a relative speed between the host vehicle and the preceding vehicle, the presence/absence of adjacent lanes, and the presence/absence of other vehicles in the adjacent lanes.

The lane change control part 33 has a lane change presence/absence determination part 33a, a lane change determination part 33b, a first index value determination part 33c, a lane determination part 33d, a second index value determination part 33e, a driver allowance determination part 33f, and an assistance control part 33g, and the lane change control part 33 executes driving assist control.

The lane change presence/absence determination part 33a receives input of the host vehicle information, the host vehicle position information, etc. In the lane change presence/absence determination part 33a, a determination is made as to whether or not a lane change has been executed in the host vehicle. The determination result in the lane change presence/absence determination part 33a is outputted to the lane change determination part 33b. In this embodiment, whether or not a lane change has been executed is assessed on the basis of a relative positional relationship between the host vehicle and white lines on the road. In the lane change presence/absence determination part 33a, it is irrelevant whether the lane change is an autonomous lane change or a lane change occurring due to the driver's operation.

The lane change determination part 33b receives input of the determination result of the lane change presence/absence determination part 33a, the host vehicle information, the host vehicle position information, the map data information, etc. In the lane change determination part 33b, when a determination result that a lane change has been executed is inputted from the lane change presence/absence determination part 33a, a determination is made as to whether or not the lane change is a "lane change occurring due to the driver's operation." Furthermore, in the lane change determination part 33b, when the determination is that the lane change is a "lane change occurring due to the driver's operation," a determination is made as to whether or not the lane change is a "lane change in a direction toward a set location." The determination result in the lane change determination part 33b is outputted to the first index value determination part 33c.

When the execution of the lane change was triggered by a steering (steering wheel) operation or a turn signal operation performed by the driver, the lane change is assessed to be a "lane change occurring due to the driver's operation." The "set location" is a parking or drop-off facility, or a road shape where a course direction changes, and is set in advance as desired. Specifically, the set location is a service area, parking area, or rest area added as an adjunct to an expressway, or a roadside station, viewpoint parking, parking lot, public lavatory, branching location, etc.

Figure 3:
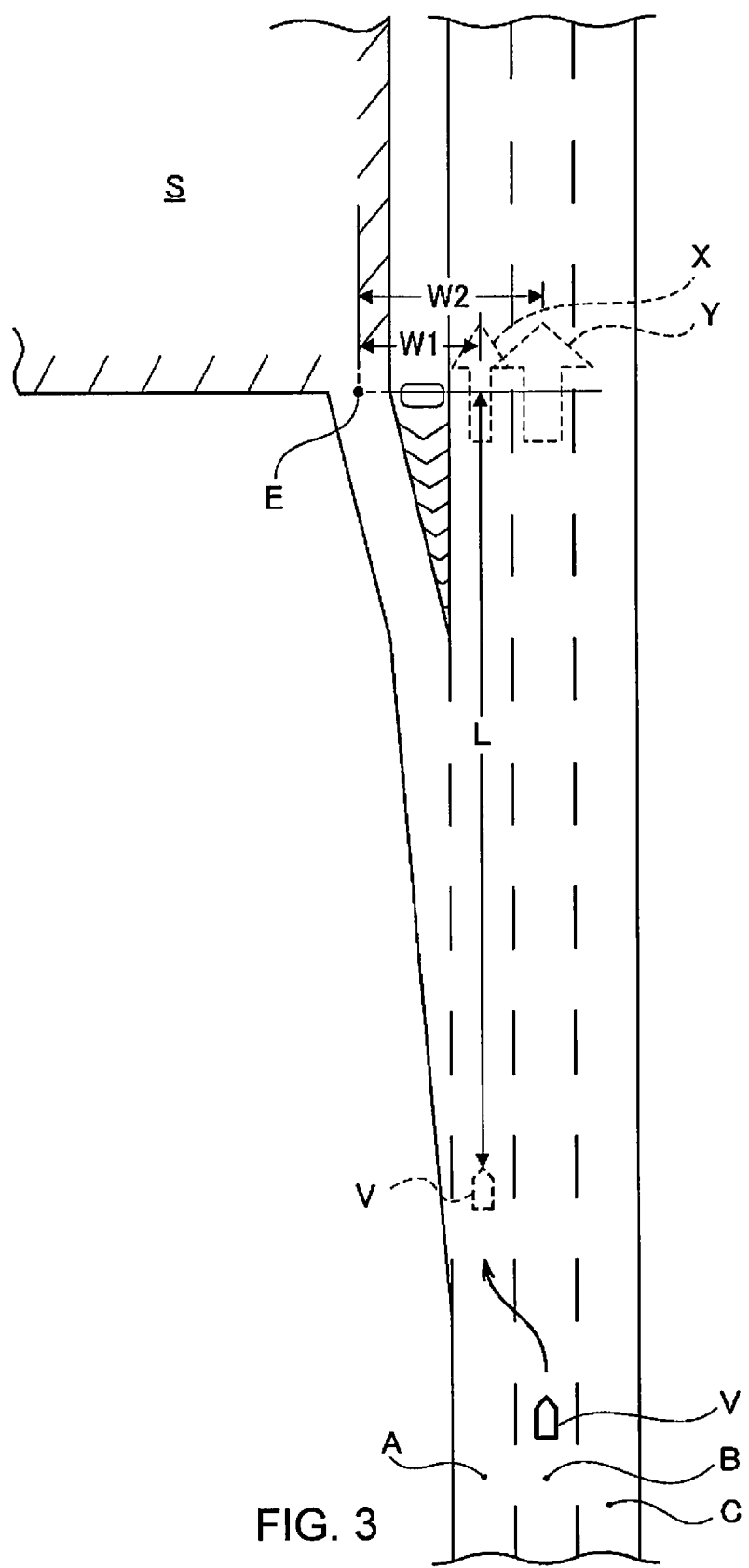
FIG. 3 is an explanatory drawing of a scenario in which a host vehicle changes lanes from a center lane to a left lane in a state in which an autonomous driving mode has been set.

A technique for determining whether or not the lane change is a "lane change in a direction toward a set location" is described below on the basis of FIG. 3. FIG. 3 shows a state in which a host vehicle V changes lanes to a left lane A while traveling in a center lane B.

First, among the set locations present ahead of the host vehicle V in the advancing direction, a set location S closest to the host vehicle is specified. Next, a vehicle-width-directional distance W1 between the post-change lane (left lane A) and the set location S and a vehicle-width-directional distance W2 between the pre-change lane (center lane B) and the set location S are calculated. After the distances W1, W2 are calculated, lengths of the distance W1 and the distance W2 are compared.

When the distance W1 is shorter than the distance W2, it is assessed that the lane change is a "lane change in a direction toward the set location" (the scenario shown in FIG. 3). In cases such as when the host vehicle V makes a lane change to a right lane C while traveling in the center lane B, the distance W1 is longer than the distance W2. Therefore, it is assessed that the lane change is a "lane change in a direction away from the set location."

Specifically, the determination of whether or not the lane change is a "lane change in a direction toward the set location" is made on the basis of the lengths of the distance W1 and the distance W2. The distance W1 and the distance W2 are specified using, for example, an entrance position E of the set location S and a widthwise center position between the lanes A and B as references.

The first index value determination part 33c (an index value determination part) receives input of the determination result of the lane change determination part 33b, the host vehicle information, the host vehicle position information, etc. In the first index value determination part 33c, when a determination result that the executed lane change is a "lane change in a direction toward the set location due to the driver's operation" is inputted from the lane change determination part 33b, a vehicle-longitudinal-directional distance L from the host vehicle V to the set location S (position index value, see FIG. 3) is calculated. A determination is then made as to whether or not the distance L (position index value) is equal to or less than a first threshold value. The determination result in the first index value determination part 33c is outputted to the lane determination part 33d. The distance L is specified using, for example, the entrance position E of the set location S and a front end of the host vehicle V as references.

In this embodiment, the "first threshold value" is a value at which it can be assessed that a set location S is present near the host vehicle V and the driver has recognized the presence of the set location S. In other words, when the distance L from the host vehicle V to the set location S is equal to or less than the first threshold value, it can be assessed that the "lane change in a direction toward the set location resulting from the driver's operation" was "executed on the basis of the driver's intention to approach the set location S." The first threshold value is specifically, for example, 2 km.

The lane determination part 33*d* receives input of the determination result of the first index value determination part 33*c*, the host vehicle information, the target route information, etc. In the lane determination part 33*d*, when a determination result that the distance L from the host vehicle V to the set location S is equal to or less than the first threshold value is inputted from the first index value determination part 33*c*, a determination is made as to whether or not the post-change lane (the left lane A in the scenario shown in FIG. 3) is a "first lane." The determination result in the lane determination part 33*d* is outputted to the second index value determination part 33*e* and the assistance control part 33*g*.

A technique for determining whether or not the post-change lane is the first lane is described below on the basis of FIG. 3. Specifically, a direction in which the post-change lane (left lane A) is oriented (a direction indicated by arrow X in FIG. 3) at the position where the host vehicle passes the set location S and a direction in which the target route is oriented (a direction indicated by arrow Y in FIG. 3) at the position where the host vehicle passes the set location S are compared. When the orientations of the two directions (arrow X and arrow Y) are the same, the determination is that "the post-change lane is the first lane." When the orientations of arrow X and arrow Y are not the same, the determination is that "the post-change lane is not the first lane."

The determination of whether or not the post-change lane is the "first lane" is a determination of whether or not the host vehicle will deviate from the target route by traveling along the post-change lane. The phrase "upon determining that the post-change lane is not the first lane" refers to when the host vehicle deviates from the target route by continuing to travel along the post-change lane. Therefore, whether or not the post-change lane heads toward the set location S is irrelevant. Additionally, the phrase "position where the host vehicle passes the set location S" refers to, for example, the entrance position E of the set location S.

The second index value determination part 33*e* receives input of the determination result of the lane determination part 33*d*, the host vehicle information, the host vehicle position information, etc. In the second index value determination part 33*e*, when the determination result that the post-change lane is not the first lane is inputted from the lane determination part 33*d*, the vehicle-longitudinal-directional distance L from the host vehicle V to the set location S (position index value, see FIG. 3) is calculated. A determination is then made as to whether or not the distance L is equal to or greater than a second threshold value. The determination result in the second index value determination part 33*e* is outputted to the driver allowance determination part 33*f* and the assistance control part 33*g*.

In this embodiment, the "second threshold value" is a value at which a lane return from the post-change lane to the first lane can be made by performing another lane change before the host vehicle arrives at the set location. In other words, when the vehicle-longitudinal-directional distance L from the host vehicle V to the set location S is equal to or greater than the second threshold value, a determination can be made that there is enough travel distance to allow a lane return. The second threshold value specifically varies depending on the shape of the road, the vehicle speed, etc., but is approximately, for example, 200-400 m.

When a determination is made by the second index value determination part 33*e* that the distance L from the host vehicle V to the set location S is equal to or greater than the second threshold value, the lane determination result made by the lane determination part 33*d*, indicating that "the post-change lane is not the first lane but a lane return before arriving at the set location is possible," is outputted to the display device 7. As a result, lane-return-encouraging information is displayed on the display device 7.

The driver allowance determination part 33*f* receives input of the determination result of the second index value determination part 33*e*, the host vehicle information, etc. In the driver allowance determination part 33*f*, when a determination result that the distance L from the host vehicle V to the set location S is equal to or greater than the second threshold value, i.e., that there is enough travel distance to allow a lane return, is received from the second index value determination part 33*e*, a determination is made as to whether or not the driver has allowed a lane return to the first lane to be executed. The determination result in the driver allowance determination part 33*f* is outputted to the assistance control part 33*g*.

The determination that "a lane return to the first lane is allowed" is made when the driver has performed a steering operation in a direction oriented toward the first lane or a turn signal operation in a direction oriented toward the first lane within a predetermined time (e.g., five seconds) following the display of the lane-return-encouraging information on the display device 7.

The assistance control part 33*g* receives input of the determination result of the lane determination part 33*d*, the determination result of the second index value determination part 33*e*, the determination result of the driver allowance determination part 33*f*, etc. In the assistance control part 33*g*, a lane change control signal that restricts an autonomous lane change in a direction away from the set location is outputted in the situations listed below.

When a lane change in a direction toward the set location is executed by the driver and the distance from the host vehicle to the set location is equal to or less than the first threshold value, a determination result that the post-change lane is the "first lane" is inputted from the lane determination part 33*d*

When a lane change in a direction toward the set location is executed by the driver and the distance from the host vehicle to the set location is equal to or less than the first threshold value, a determination result that the distance from the host vehicle to the set location is less than the second threshold value is inputted from the second index value determination part 33*e* even if a determination result that the post-change lane is not the "first lane" is inputted When a lane change in a direction toward the set location is executed by the driver, the distance from the host vehicle to the set location is equal to or less than the first threshold value, and a determination result that the post-change lane is not the "first lane" is inputted, a determination result that a lane return to the "first lane" is not allowed is inputted from the driver allowance determination part 33*f* even if the distance from the host vehicle to the set location is equal to or greater than the second threshold value After outputting the lane change control signal restricting an autonomous lane change in a direction away from the set location, the assistance control part 33g starts a count of the distance L from the host vehicle V to the set location S. Upon determining that the distance L has come to be equal to or less than an arrival determination distance, a lane change control signal is outputted, restricting an autonomous lane change in a direction away from the set location S. The "arrival determination distance" is a distance at which it can be assessed that the host vehicle has arrived at or passed the set location. This distance is a predetermined distance that uses the entrance position E of the set location S as a reference, and can be a distance including an area in front of the entrance position E or an area behind the entrance position E.

In the assistance control part 33g, a lane change control signal allowing an autonomous lane change in a direction away from the set location is outputted in the following situation.

When a lane change in a direction toward the set location is executed by the driver, the distance from the host vehicle to the set location is equal to or less than the first threshold value, and a determination result that the post-change lane is not the "first lane" is inputted, the distance from the host vehicle to the set location is equal to or greater than the second threshold value and a determination result that a lane return to the "first lane" is allows is inputted from the driver allowance determination part 33f The lane change control signal from the assistance control part 33g is outputted to the lane change execution determination part 34.

The phrase "restricting an autonomous lane change in a direction away from the set location" means that even if a lane change request is outputted due to the autonomous lane change requirement being satisfied, performing an autonomous lane change (a lane change under autonomous driving) is prohibited (an autonomous lane change is not carried out) when the lane change is in a direction away from the set location. A "lane change in a direction away from the set location" is a lane change in which the vehicle-width-directional distance between the set location and the target lane is longer than the vehicle-width-directional distance between the set location and the host vehicle lane. At this time, if the lane change is a result of the driver's operation, the lane change is not restricted even if the lane change is in a direction away from the set location. Additionally, a lane change in a direction toward the set location is not restricted even if the lane change is an autonomous lane change based on the lane change request.

The phrase "allowing an autonomous lane change in a direction away from the set location" means that when a lane change request is outputted due to the autonomous lane change requirement being satisfied, an autonomous lane change (a lane change under autonomous driving) is carried out even if the lane change is in a direction away from the set location. In other words, when an autonomous lane change in a direction away from the set location is allowed, the autonomous lane change can be performed when the lane change request is outputted, regardless of the positional relationship between the target lane and the set location.

The lane change execution determination part 34 receives input of the lane change request from the lane change request part 32, receives input of the lane change control signal from the lane change control part 33, and receives input of the host vehicle information, the host vehicle surroundings information, etc. Autonomous lane change allowance control is executed on the basis of the various inputted information. Specifically, in the lane change execution determination part 34, when a lane change request is inputted, a determination is made as whether or not to prioritize either a lane change request for traveling along the target route or a lane change request for passing a preceding vehicle, and the lane change request is reconciled. When a lane change request for traveling along the target route and a lane change request for passing a preceding vehicle would have different target lanes, the lane change request for traveling along the target route is prioritized.

In the lane change execution determination part 34, after the lane change request is reconciled, a determination is made as to whether or not the autonomous lane change condition has been fulfilled. When the determination is that the autonomous lane change condition has been fulfilled, a determination is made as to whether or not an autonomous lane change based on the lane change request can be executed. In other words, a determination is made as to whether or not a lane change in a direction toward the target lane is restricted by the lane change control signal. When a lane change in a direction toward the target lane is restricted, the lane change request is ignored and an autonomous lane change is not executed. When a lane change in the requested direction is allowed, an autonomous lane change based on the lane change request is executed. Even if an autonomous lane change is allowed, an autonomous lane change is not executed upon determining that a lane change cannot be executed on the basis of the host vehicle surroundings information, etc.

Process Configuration of Driving Assist Control

Figure 4:
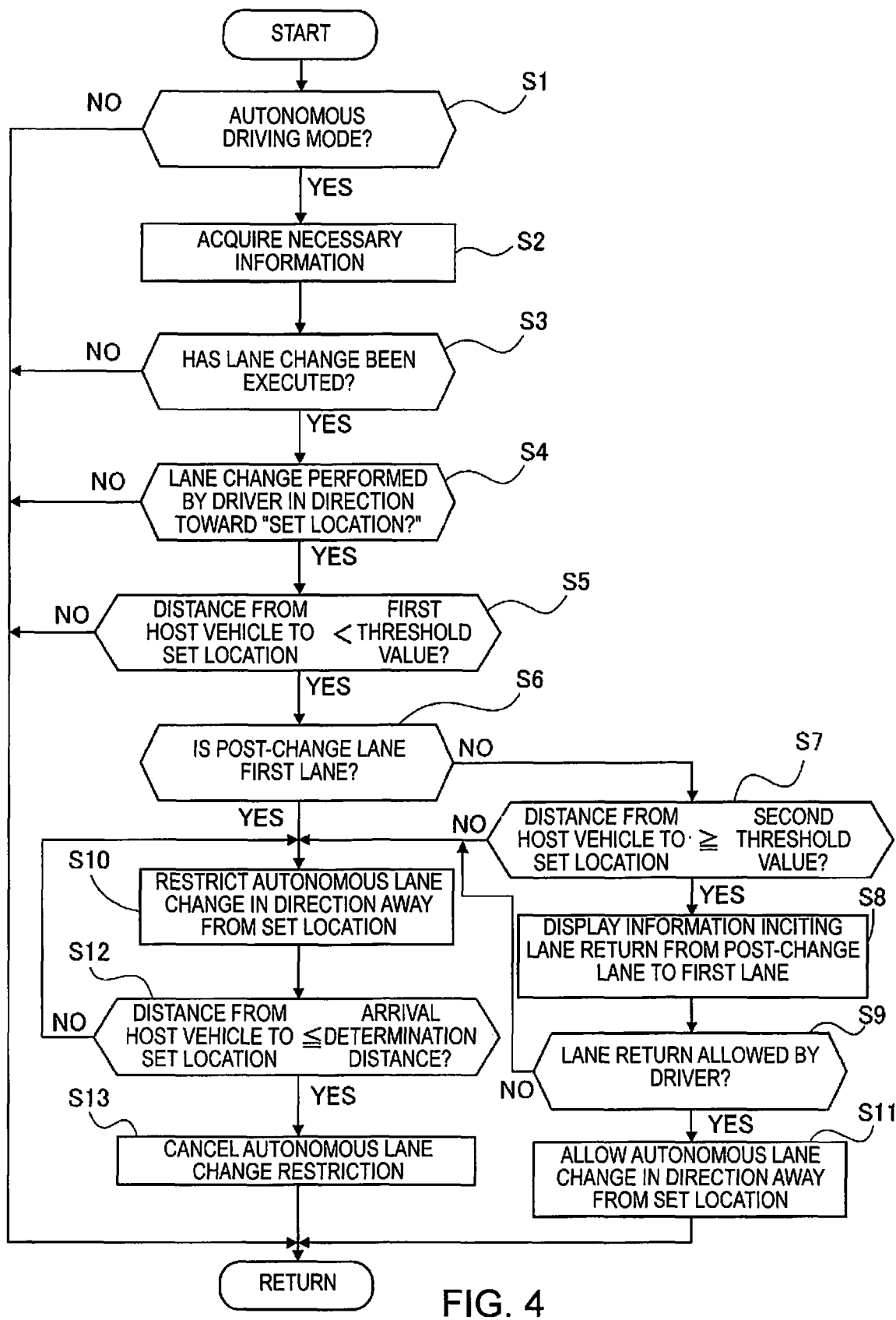
FIG. 4 is a flowchart of a flow of driving assist control executed by the recognition determination processor of the first embodiment.

FIG. 4 is a flowchart of a flow of driving assist control. Individual steps of FIG. 4 are described below.

In step S1, a determination is made as to whether or not autonomous driving mode has been set as the driving mode of the host vehicle. When the determination is YES (autonomous driving mode), the process advances to S2. When the determination is NO (manual driving mode), the process advances to RETURN. The term "autonomous driving mode" refers to traveling along the target route or the target lane while the actuator 5 is controlled, on the basis of a control command from the autonomous driving control unit 4. "Autonomous driving mode" is set by the driver by operating a setting switch (not shown), etc.

In step S2, in continuation from the determination in step S1 that the driving mode is autonomous driving mode, the host vehicle information, the host vehicle position information, the host vehicle surroundings information, the map data information, the target route information, the destination information, and other various necessary information is acquired, and the process advances to S3. Step S2 corresponds to the information acquisition part 31.

In step S3, in continuation from the information acquisition in step S2, whether or not a lane change has been executed in the host vehicle is assessed on the basis of the variety of information acquired in step S2. When the determination is YES (lane change executed), the process advances to S4. When the determination is NO (no lane change), the process advances to RETURN. Step S3 corresponds to the lane change presence/absence determination part 33a.

In step S4, in continuation from the lane change execution in step S3, a determination is made as to whether or not the lane change that was assessed to have been executed in step S3 is a lane change in a direction toward a set location due to the driver's operation, on the basis of the variety of information acquired in step S2. When the determination is YES (lane change performed by driver in direction toward set location), the process advances to S5. When the determination is NO (autonomous lane change, or lane change in direction away from set location), the process advances to RETURN. Step S4 corresponds to the lane change determination part 33b.

In step S5, in continuation from the lane change performed by the driver in the direction of the set location in step S4, a determination is made as to whether or not the distance from the host vehicle to the set location is equal to or less than the first threshold value, which has been set in advance. When the determination is YES (distance from host vehicle to set location≤first threshold value), the process advances to S6. When the determination is NO (distance from host vehicle to set location>first threshold value), the process advances to RETURN. Step S5 corresponds to the first index value determination part 33c.

In step S6, in continuation from the determination in step S5 that the distance from the host vehicle to the set location is equal to or less than the first threshold value, a determination is made as to whether or not the post-change lane arrived at due to the lane change assessed to have been executed in step S3 is the "first lane." When the determination is YES (post-change lane=first lane), the process advances to S10. When the determination is NO (post-change lane≠first lane), the process advances to S7. Step S6 corresponds to the lane determination part 33d.

In step S7, in continuation from the determination in step S6 that the post-change lane is not the first lane, a determination is made as to whether or not the distance from the host vehicle to the set location is equal to or greater than the second threshold value, which has been set in advance. When the determination is YES (distance from host vehicle to set location≥second threshold value), the process advances to S8. When the determination is NO (distance from host vehicle to set location<second threshold value), the process advances to S10. Step S7 corresponds to the second index value determination part 33e.

In step S8, in continuation from the determination in step S7 that distance from the host vehicle to the set location is equal to or greater than the second threshold value, information prompting a lane return from the post-change lane to the first lane (lane-return-encouraging information) is displayed on the display device 7, and the process advances to S9.

In step S9, in continuation from the display of the lane-return-encouraging information in step S8, a determination is made as to whether or not the driver has allowed a lane return to be executed. When the determination is YES (lane return allowed), the process advances to S11. When the determination is NO (lane return not allowed), the process advances to S10. Step S9 corresponds to the driver allowance determination part 33f.

In step S10, in continuation from either the determination in step S6 that the post-change lane is the first lane, the determination in step S7 that the distance from the host vehicle to the set location is less than the second threshold value, or the determination in step S9 that a lane return is not allowed, a lane change control signal restricting an autonomous lane change in a direction away from the set location is outputted, and the process advances to S12. As a result, even if the autonomous lane change requirement has been satisfied, an autonomous lane change in a direction away from the set location is not executed.

In step S11, in continuation from the determination in step S9 that a lane return is allowed, a lane change control signal allowing an autonomous lane change in a direction away from the set location is outputted, and the process advances to RETURN. As a result, when the autonomous lane change requirement has been satisfied, an autonomous lane change in a direction away from the set location can be executed. Step S10 and step S11 correspond to the assistance control part 33g.

In step S12, in continuation from the autonomous lane change restriction in step S10, a determination is made as to whether or not the distance from the host vehicle to the set location is equal to or less than an arrival determination distance, which has been set in advance. When the determination is YES (distance from host vehicle to set location≤arrival determination distance), the process advances to S13. When the determination is NO (distance from host vehicle to set location>arrival determination distance), the process returns to step S10.

In step S13, in continuation from the determination in step S12 that the distance from the host vehicle to the set location is equal to or less than the arrival determination distance, a lane change control signal canceling the restriction on an autonomous lane change in a direction away from the set location is outputted, and the process advances to RETURN. As a result of the process in step S12 and step S13, the state of restricting an autonomous lane change in a direction away from the set location is maintained until the host vehicle arrives at or passes the set location.

Process Configuration of First Lane Change Control

Figure 5:
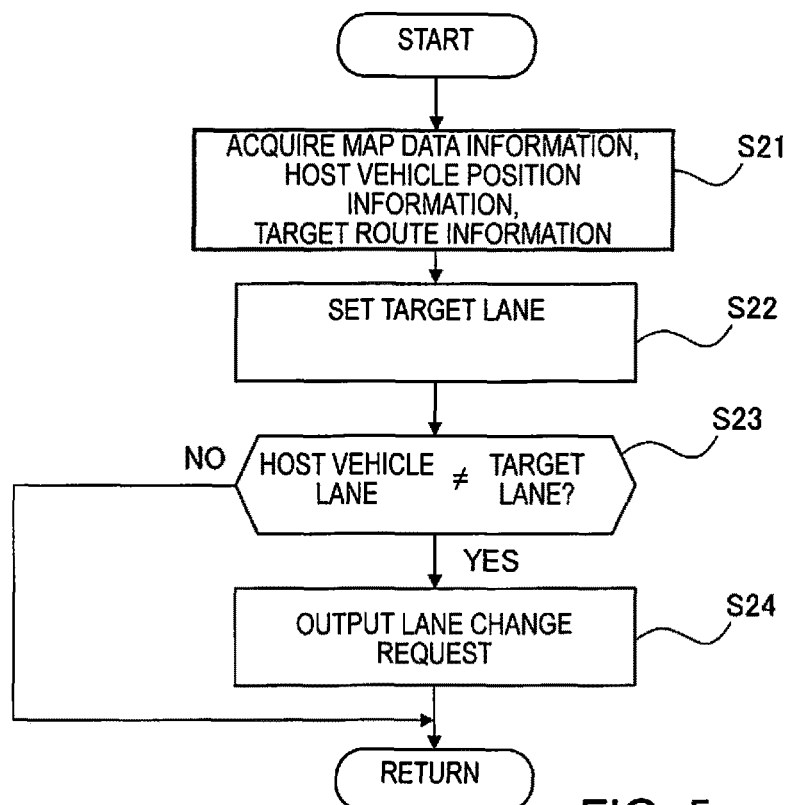
FIG. 5 is a flowchart of a flow of first lane change control executed by the recognition determination processor of the first embodiment.

FIG. 5 is a flowchart of a flow of first lane change control. Individual steps of FIG. 5 are described below. The steps shown in FIG. 5 correspond to the lane change request part 32.

In step S21, map data information, host vehicle position information, and target route information are acquired, and the process advances to S22.

In step S22, in continuation from the acquisition of information in step S21, a target lane that satisfies a travel condition set in advance is set while travel along a target route is secured on the basis of the information acquired in step S21, and the process advances to S23. The term "travel condition" refers to a lane being, for example, the lane in the center of the road, the lane in which the distance to the nearest preceding vehicle is longest, the traveled lane, etc.

In step S23, in continuation from the setting of the target lane in step S22, a determination is made as to whether or not the host vehicle lane in which the host vehicle is currently traveling and the target lane are not the same. When the determination is YES (host vehicle lane≠target lane), the process advances to S24. When the determination is NO (host vehicle lane=target lane), the process advances to RETURN.

In step S24, in continuation from the determination in step S23 that the host vehicle lane is not the target lane, a lane change request that requests a lane change toward the target lane set in step S22 is outputted, and the process advances to RETURN.

Process Configuration of Second Lane Change Control

Figure 6:
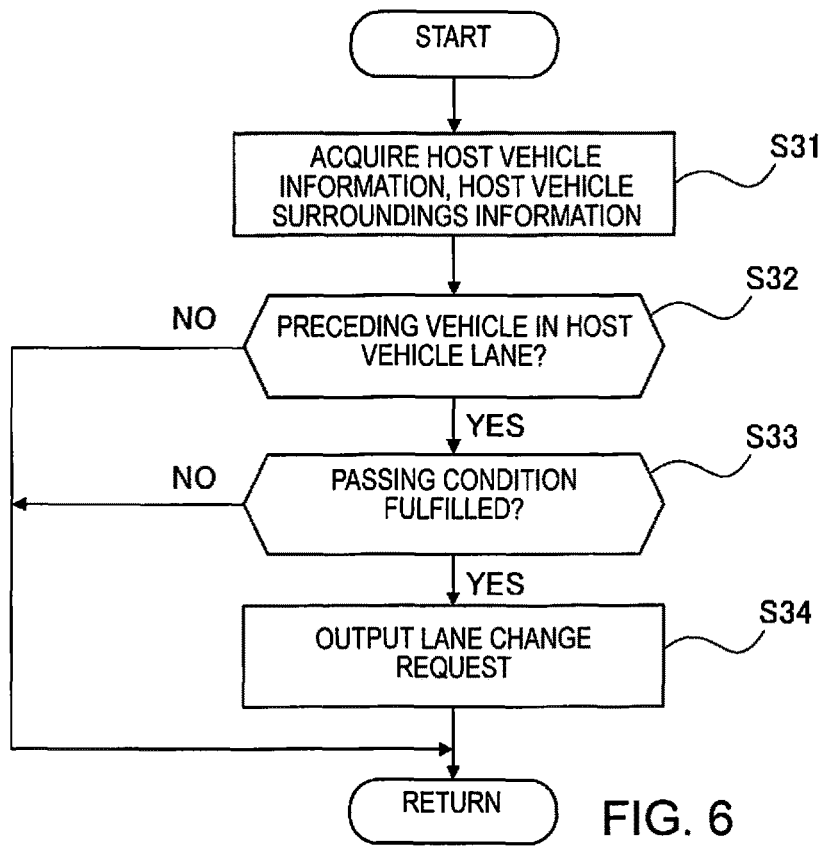
FIG. 6 is a flowchart of a flow of second lane change control executed by the recognition determination processor of the first embodiment.

FIG. 6 is a flowchart of a flow of second lane change control. Individual steps of FIG. 6 are described below. The steps shown in FIG. 6 correspond to the lane change request part 32.

In step S31, host vehicle information and host vehicle surroundings information are acquired, and the process advances to S32.

In step S32, in continuation from the acquisition of information in step S31, a determination is made, on the basis of the information acquired in step S31, as to whether or not a preceding vehicle is present in the host vehicle lane in which the host vehicle is currently traveling. When the determination is YES (preceding vehicle), the process advances to S33. When the determination is NO (no preceding vehicle), the process advances to RETURN.

In step S33, in continuation from the determination in step S32 that there is a preceding vehicle, a determination is made as to whether or not a condition for passing the preceding vehicle has been fulfilled. When the determination is YES (passing condition fulfilled), the process advances to S34. When the determination is NO (passing condition not fulfilled), the process advances to RETURN.

In step S34, in continuation from the determination in step S33 that the passing condition is fulfilled, a lane change request, which requests execution of a lane change for passing the preceding vehicle detected in step S32, is outputted, and the process advances to RETURN. The target lane at this time is, in principle, a right-side adjacent lane to the host vehicle lane.

Process Configuration of Autonomous Lane Change Allowance Control

Figure 7:
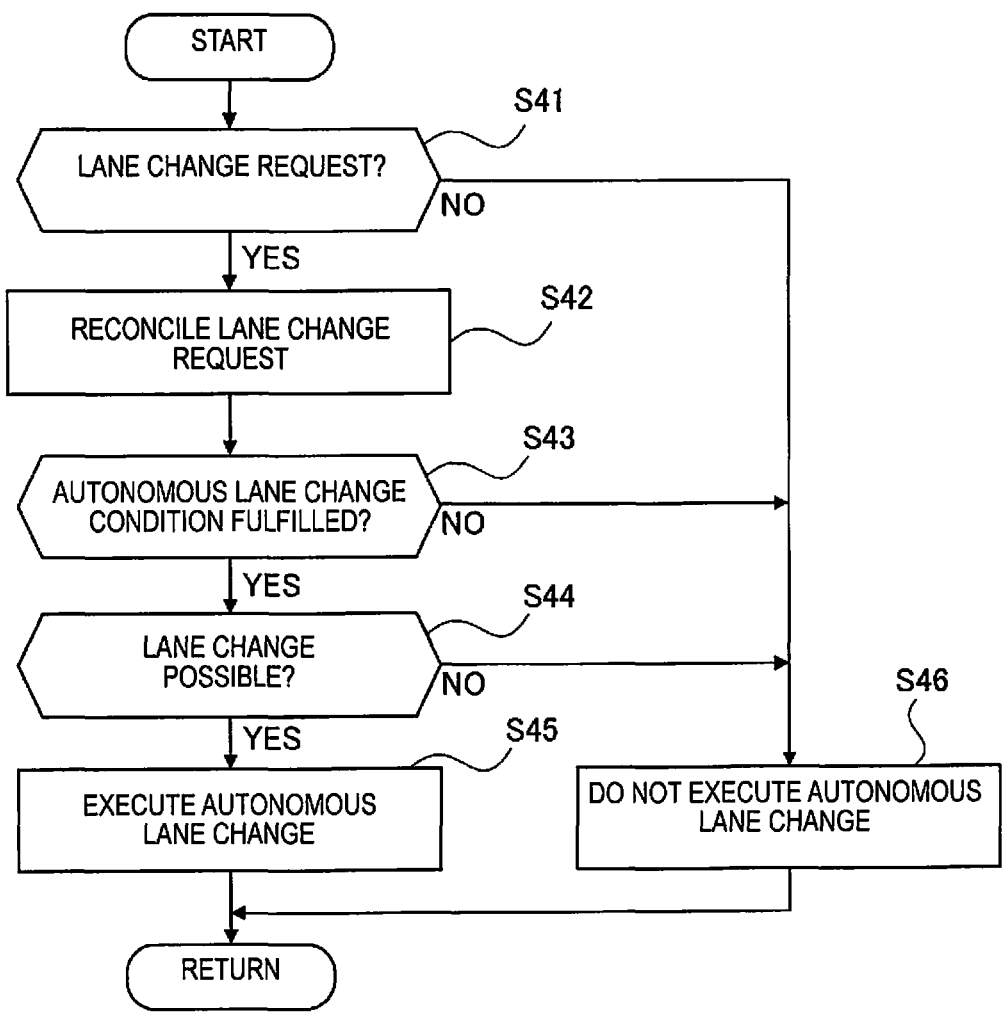
FIG. 7 is a flowchart of a flow of autonomous lane change allowance control executed by the recognition determination processor of the first embodiment.

FIG. 7 is a flowchart of a flow of autonomous lane change allowance control. Individual steps of FIG. 7 are described below. The steps shown in FIG. 7 correspond to the lane change execution determination part 34.

In step S41, a determination is made as to whether or not a lane change request has been outputted. When the determination is YES (lane change request), the process advances to S42. When the determination is NO (no lane change request), the process advances to S46.

In step S42, in continuation from the determination in step S41 that there is a lane change request, a reconciliation of the lane change request is performed, and the process advances to S43. The term "reconciliation of the lane change request" refers to a determination of whether or not to prioritize either a lane change request for traveling along the target route or a lane change request for passing a preceding vehicle.

In step S43, in continuation from the reconciliation of the lane change request in step S42, a determination is made as to whether or not an autonomous lane change condition has been fulfilled. When the determination is YES (condition fulfilled), the process advances to S44. When the determination is NO (condition not fulfilled), the process advances to S46. The autonomous lane change condition is, inter alia, that high-precision three-dimensional map data (a dynamic map) is included as the map data, that autonomous driving mode has been set, or that a lane change in the requested direction is not restricted by the lane change control signal; i.e., a lane change in the requested direction is allowed on the basis of the lane change control signal.

In step S44, in continuation from the determination in step S43 that the condition is fulfilled, a determination is made as to whether or not it is possible to execute an autonomous lane change. When the determination is YES (lane change is possible), the process advances to step S45. When the determination is NO (lane change is not possible), the process advances to step S46. The possibility of a lane change is assessed on the basis of the presence of an adjacent lane, the presence of another vehicle in the adjacent lane, the type of white lines on the road, etc. When it is possible to execute a lane change, an indication that a lane change will be performed autonomously is displayed on the display device 7, and the driver is notified of the autonomous lane change execution.

In step S45, in continuation from the determination in step S44 that a lane change is possible, an autonomous lane change based on the lane change request reconciled in step S42 is executed, and the process advances to RETURN.

In step S46, in continuation from either the determination in step S41 that there is no lane change request, the determination in step S43 that the autonomous lane change condition is not fulfilled, or the determination in step S44 that a lane change is not possible, the process advances to RETURN without an autonomous lane change being executed.

Next, the actions of the driving assist method and the driving assist device of the first embodiment shall be described, the description being divided into the sections "Autonomous Lane Change Restriction Action (1)," "Autonomous Lane Change Restriction Action (2)," and "Autonomous Lane Change Allowance Action."

Autonomous Lane Change Restriction Action (1)

A situation is considered in which the host vehicle V is traveling in the center lane B with autonomous driving mode having been set, and then changes lanes to the left lane A, as shown in FIG. 3. At this time, the left lane A corresponds to the post-change lane and the center lane B corresponds to the pre-change lane.

At this time, in the flowchart shown in FIG. 4, the process advances in the order of step S1, step S2, step S3, and step S4, and a determination is made as to whether or not the lane change of the host vehicle V from the center lane B to the left lane A is a lane change in a direction toward the "set location" due to the driver's operation.

The lane change described above is, in this situation, a lane change executed by the driver's steering operation. Additionally, in this situation, the set location S is present on the left side of the road. Therefore, the lane change from the center lane B to the left lane A is a lane change in a direction toward the "set location." In other words, the lane change from the center lane B to the left lane A in the scenario shown in FIG. 3 is assessed to be a "lane change in a direction toward the set location due to the driver's operation."

Thus, the process advances to S5, a determination is made as to whether or not the distance L from the host vehicle V to the set location S is equal to or less than the first threshold value. In the scenario shown in FIG. 3, the distance L is equal to or less than the first threshold value. Therefore, the process advances to S6 on the assumption that the driver recognizes the presence of the set location S, and whether or not the post-change lane (left lane A) is the "first lane" is assessed. In the scenario shown in FIG. 3, the direction in which the left lane A is oriented (arrow X) and the direction in which the target route is oriented (arrow Y) are the same in the position where the host vehicle passes the set location S (the entrance position E of the set location S). Therefore, the process advances to S10 on the assumption that the left lane A, which is the post-change lane, is the "first lane." As a result, an autonomous lane change in a direction away from the set location S is restricted. The process then advances to step S12 and step S13, and an autonomous lane change toward the center lane B continues to be restricted until the host vehicle V passes the set location S.

A situation is considered in which, for example, the driver changes lanes from the center lane B to the left lane A with the intention (objective) of approaching the set location S. However, at this time, a lane change request is outputted due to a condition for passing a preceding vehicle (not shown in this situation) being fulfilled, and when an autonomous lane change from the left lane A to the center lane B is executed, the host vehicle V moves away from the lane (left lane A) in the position close to the set location S. This is not autonomous driving conforming to the driver's intention, and therefore leads to an unpleasant sensation for the driver.

In contrast, as a result of the process having advanced to step S10, an autonomous lane change in a direction away from the set location S is restricted, and an autonomous lane change is not performed in a direction away from the set location S. Specifically, even if the condition for passing a preceding vehicle traveling in front of the host vehicle V is fulfilled and a lane change request is outputted, an autonomous lane change toward the center lane B is not executed until the set location S is passed. Therefore, it is possible to prevent an autonomous lane change that does not conform to the driver's intention of approaching the set location S. Consequently, autonomous driving that respects the driver's intention can be realized.

Autonomous Lane Change Restriction Action (2)

Figure 8:
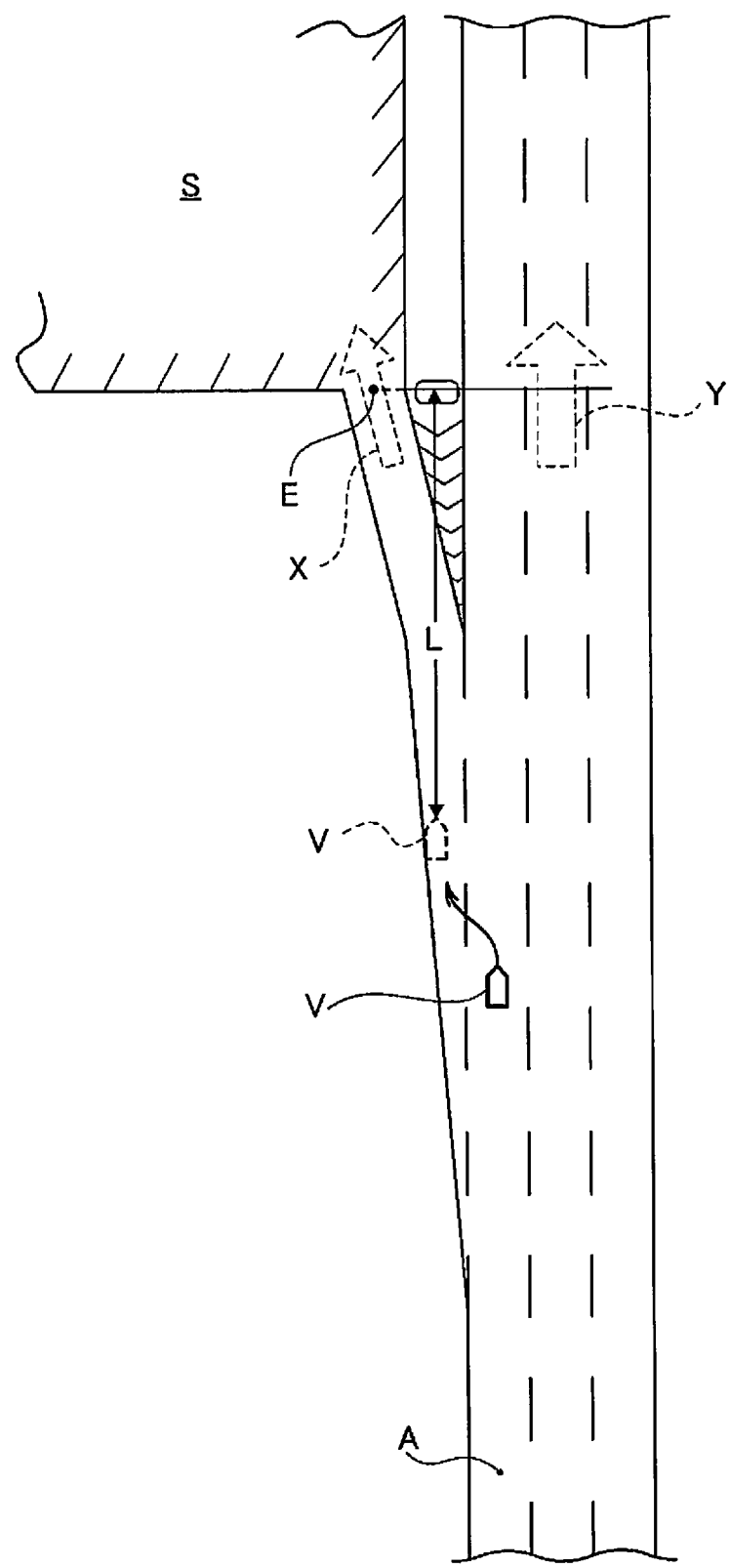
FIG. 8 is an explanatory drawing of a scenario in which the host vehicle changes lanes from the left lane to a branch lane in a state in which the autonomous driving mode has been set.

A situation is considered in which the host vehicle V is traveling in the left lane A with autonomous driving mode having been set, and then changes lanes to a branch lane D due to the driver's operation, as shown in FIG. 8. At this time, the branch lane D corresponds to the post-change lane and the left lane A corresponds to the pre-change lane. Additionally, the location at which the lane change from the left lane A to the branch lane D is performed is the location at which the distance L from the host vehicle V to the set location S comes to be equal to or less than the first threshold value.

At this time, in the flowchart shown in FIG. 4, the process advances in the order of step S1, step S2, step S3, step S4, step S5, and step S6, and a determination is made as to whether or not the post-change lane (the branch lane D) is the "first lane." The direction in which the branch lane D is oriented (arrow X) and the direction in which the target route is oriented (arrow Y) are not the same direction at the position where the host vehicle passes the set location S (the entrance position E of the set location S), as shown in FIG. 8. In other words, the host vehicle deviates from the target route when continuing to travel on the post-change lane (the branch lane D). Therefore, the process advances to S7 on the assumption that the branch lane D, which is the post-change lane, is not the "first lane."

A determination is thereby made as to whether or not the distance L from the host vehicle V to the set location S is equal to or greater than the second threshold value. In the scenario shown in FIG. 8, the distance L is equal to or greater than the second threshold value. Therefore, the process advances in the order of step S8 and step S9 on the assumption that it is possible to make a lane return to the left lane A, which is the "first lane," before arriving at the set location S. Specifically, lane-return-encouraging information is displayed on the display device 7 and a determination is made as to whether or not a lane return to the left lane A is allowed by the driver.

Even when a predetermined time has elapsed following the display of the lane-return-encouraging information on the display device 7, when the driver does not operate the right turn signal, the process advances to S10 on the assumption that a lane return to the left lane A is not allowed by the driver. As a result, an autonomous lane change in a direction away from the set location S is restricted.

In this situation, when the post-change lane is not the first lane (when the post-change lane is a lane oriented toward the set location S) and an autonomous lane change in a direction away from the set location S is restricted, a lane return to the "first lane" performed by an autonomous lane change is not executed. Specifically, the possibility of deviating from the target route and heading toward the set location S increases.

Conversely, when there is a possibility of deviating from the target route due to the execution of a "lane change in a direction toward the set location due to the driver's operation," a lane return is prompted and whether or not a lane return is allowed is assessed. Therefore, an autonomous lane change in a direction away from the set location S can be restricted upon recognizing the driver's intention. Consequently, autonomous driving that respects the driver's intention can be more appropriately realized.

Autonomous Lane Change Allowance Action

A situation is considered in which, when traveling in the left lane A with autonomous driving mode having been set, the host vehicle V has changed lanes to a branch lane D due to the driver's operation, as shown in FIG. 8, the lane change to the branch lane D not being in conformity with the driver's intention.

Specifically, in the flowchart shown in FIG. 4, the process advances to S9, and when the determination is made as to whether or not a lane return to the left lane A is allowed by the driver, the driver is assumed to have operated the left turn signal within the predetermined time following the display of the lane-return-encouraging information on the display device 7. In this situation, the process advances from step S9 to step S11 on the assumption that a lane return to the left lane A has been allowed by the driver. As a result, an autonomous lane change in a direction away from the set location S is allowed.

In this situation, at times such as when the driver has mistakenly made a lane change to the branch lane D, it is assumed that although a "lane change in a direction toward the set location due to the driver's operation" has been executed, the driver does not have the intention (objective) of approaching the set location. In other words, the driver's intention is to continue traveling along the target route. In such a situation, if a lane return is not quickly performed, travel along the target route will not longer be possible and the host vehicle will come to be traveling contrary to the driver's intention.

As a countermeasure to this, when the driver allows a lane return, an autonomous lane change in a direction away from the set location S is allowed as a result of the process advancing to step S11. Thus, when a request is then outputted to make a lane change toward the left lane A due to the host vehicle lane and the target lane being different, an autonomous lane change from the branch lane D toward the left lane A is executed. As a result, autonomous driving conforming to the driver's intention, which is to continue traveling along the target route, can be performed.

Due to allowing an autonomous lane change in a direction away from the set location S only when the driver has allowed a lane return, it is possible to recognize the driver's intention in a "lane change in a direction toward the set location due to the driver's operation" as being either to approach the set location S or to not approach the set location S (a different mistake, etc.). Therefore, an autonomous lane change not conforming to the driver's intention can be appropriately prevented, and autonomous driving that respects the driver's intention can be realized.

When the post-change lane is not the "first lane," lane-return-encouraging information is displayed on the display device 7 and the driver is prompted to make a lane return to the first lane. Therefore, the driver can be aware that the host vehicle V will deviate from the target route if the host vehicle continues to travel along the host vehicle lane being traveled on. Specifically, the driver can be made aware of a deviation from the target route and prompted to travel along the target route.

Furthermore, by determining whether or not a lane return is allowed while the driver is made aware of a deviation from the target route, it is possible to accurately recognize whether or not a "lane change in a direction toward the set location due to the driver's operation" conforms to the driver's intention to approach the set location S, and to more appropriately prevent an autonomous lane change that does not conform to the driver's intention.

Next, effects shall be described. In the driving assist method and the driving assist device of the first embodiment, the effects enumerated below can be achieved.

(1) A driving assist method performed by a controller (recognition determination processor 3) that executes driving assist control in which a target route is generated and a lane change assist, which assists a lane change based on the target route, is performed (FIG. 3), the driving assist method configured such that:

determining whether or not the lane change has been executed (step S3);

determining whether or not the lane change is a lane change in a direction toward a preset location S, due to a driver's operation (step S4) upon determining that the lane change has been executed;

determining whether or not a position index value (distance L) from the host vehicle V to the preset location S is equal to or less than a first threshold value (step S5) upon determining that the lane change is a lane change in the direction toward the preset location S due to the driver's operation; and restricting the lane change assist (an autonomous lane change) in a direction away from the set location S (step S10) upon determining that the position index value (distance L) is equal to or less than the first threshold value.

A lane change assist that does not conform to the driver's intention can thereby be prevented.

(2) The driving assist method is configured such that: determining whether or not a post-change lane is a first lane in which travel along the target route can continue (step S6) upon determining that the position index value (distance L) is equal to or less than the first threshold value;

determining whether or not the position index value (distance L) is equal to or greater than a second threshold value at which a lane return from the post-change lane to the first lane is possible (step S7) upon determining that the post-change lane is not the first lane; and issuing a notification prompting the driver to perform the lane return (lane-return-encouraging information) (step S8) upon determining that the position index value (distance L) is equal to or greater than the second threshold value.

Thus, the driver can be made aware that the host vehicle will deviate from the target route by continuing to travel along the post-change lane, and can be prompted to travel along the target route.

(3) The driving assist method is configured such that: a determination is made as to whether or not the lane return is allowed by the driver (step S9) when the driver is prompted to make a lane return to the first lane; and allowing a lane change assist (an autonomous lane change) in the direction away from the set location S when the lane return is allowed (step S11), and restricting a lane change assist (an autonomous lane change) in the direction away from the preset location S when the lane return is not allowed (step S10).

Thus, control of a lane change assist can be performed upon recognizing the driver's intention, and a lane change assist that does not conform to the driver's intention can be more appropriately prevented.

(4) A driving assist device comprising a controller (recognition determination processor 3) that executes driving assist control in which a target route is generated and in which a lane change assist is preformed that assists in a lane change based on the target route (FIG. 3), the driving assist device configured such that the controller (recognition determination processor 3) includes:

a lane change presence/absence determination part 33a that determines whether or not a lane change has been executed;

a lane change determination part 33b that determines whether or not the lane change is a lane change in a direction toward a preset location S due to a driver's operation upon the lane change presence/absence determination part 33a having determined that the lane change has been executed;

an index value determination part (first index value determination part 33c) that determines whether or not a position index value (distance L) from the host vehicle V to the preset location S is equal to or less than a first threshold value upon the lane change determination part 33b having determined that the lane change is a lane change in a direction toward the preset location S due to the driver's operation; and an assistance control part 33g that restricts the lane change assist (an autonomous lane change) in a direction away from the preset location S upon the index value determination part (first index value determination part 33c) having determined that the position index value (distance L) is equal to or less than the first threshold value.

The lane change assist that does not conform to the driver's intention can thereby be prevented.

The driving assist method and the driving assist device of the present disclosure were described above on the basis of the first embodiment, but the first embodiment is not provided by way of limitation on the specific configuration; changes, additions, etc., to the design are allowed as long as there is no deviation from the scope of the invention as in the claims.

In the first embodiment, an example was presented in which the lane change assist performed by the recognition determination processor 3 is an autonomous lane change. However, the "lane change assist" need only assist a lane change that is necessary when traveling on the basis of the generated target route; accordingly, an autonomous lane change is not provided by way of limitation. For example, the target lane can be displayed on the display device 7, or lane change guidance can be provided in a form such as giving vocal notification of a lane change. Even in such situations, if the driver's intention is to approach the set location S, providing many instances of guidance for a lane change in a direction away from the set location S leads to an unpleasant sensation for the driver. In contrast, unpleasant sensations for the driver can be prevented and a lane change assist that does not conform to the drivers' intention can be prevented by restricting guidance for a lane change in a direction away from the set location S. When guidance for a lane change is performed as a lane change assist, the drive-assisted vehicle need not be an autonomously driven vehicle.

Furthermore, regarding the restricting of a lane change assist, in the first embodiment, an example was presented in which an autonomous lane change in a direction away from the set location S is not performed (an autonomous lane change is prohibited). However, this example is not provided by way of limitation. As another example, an autonomous lane change in a direction away from the set location S is not completely prohibited, and the required condition for an autonomous lane change is set to a higher level of stringency than when an autonomous lane change is allowed. A lane change assist can be restricted by making it more difficult for an autonomous lane change in a direction away from the set location S to be executed than when an autonomous lane change is allowed.

In the first embodiment, an example was presented in which distance L is used as a position index value from the host vehicle V to the set location S. However, the position index value need only be a value whereby the positional relationship between the host vehicle V and the set location S can be ascertained. Therefore, for example, a time until arrival at the set location S, which is determined by dividing the distance L from the host vehicle V to the set location S by a travel speed, can be used as the position index value. In this situation, the first threshold value and the second threshold value can be changed in accordance with the travel speed.

In the first embodiment, a character string signifying prompting of a lane return and an arrow indicating the target lane were given as examples of lane-return-encouraging information for a situation in which lane-return-encouraging information is displayed on the display device 7 when the post-change lane after execution of a "lane change in a direction toward the set location due to the driver's operation" is not the "first lane." However, these examples are not provided by way of limitation on the lane-return-encouraging information. For example, the lane-return-encouraging information can be a character string having the meaning simply that the post-change lane is not the "first lane," a character string having the meaning that the post-change lane is a lane oriented toward the set location, etc. In other words, the display need not actively prompt a lane return. The display need only enable the driver to recognize that the post-change lane is not the first lane and the target route will be deviated from if a lane return is not executed, but a lane return can yet be executed.

In the first embodiment, an example was presented in which the display device 7 is a device that provides visually recognizable information, but this example is not provided by way of limitation. For example, the display device 7 can be a device that provides voice information or a device that transmits a variety of information to the driver through vibration, etc.

Furthermore, when the post-change lane after execution of a "lane change in a direction toward the set location due to the driver's operation" is not the "first lane," it is sufficient merely to issue a notification prompting the driver to make a lane return while a lane change assist (e.g., an autonomous lane change) in a direction away from the set location S is restricted. In other words, a lane change assist can continue to be restricted in a direction away from the set location S while the lane-return-encouraging information remains displayed. In this situation, the driver can be made aware that the post-change lane is not the "first lane" while respect is given to the driver's intention in the event that a "lane change in a direction toward the set location as a result of the driver's operation" is executed.

The invention claimed is:

1. A driving assist method performed by a controller that executes driving assist control in which a target route is generated and in which a lane change assist is preformed that assists in a lane change based on the target route, the driving assist method comprising:
   determining whether or not the lane change has been executed;
   determining whether or not the lane change is in a direction toward a preset location due to a driver's operation upon determining that the lane change has been executed;
   determining whether or not a position index value from the host vehicle to the preset location is equal to or less than a first threshold value upon determining that the lane change is in the direction toward the preset location due to the driver's operation; and
   restricting the lane change assist in a direction away from the preset location upon determining that the position index value is equal to or less than the first threshold value.

2. The driving assist method according to claim 1, further comprising
   determining whether or not a post-change lane is a first lane in which travel along the target route can continue upon determining that the position index value is equal to or less than the first threshold value;
   determining whether or not the position index value is equal to or greater than a second threshold value at which a lane return from the post-change lane to the first lane is possible upon determining that the post-change lane is not the first lane; and
   issuing a notification prompting the driver to perform the lane return upon determining that the position index value is equal to or greater than the second threshold value.

3. The driving assist method according to claim 2, further comprising
   determining whether or not the lane return is allowed by the driver when the driver is prompted to make a lane return to the first lane; and
   allowing the lane change assist in the direction away from the preset location when the lane return is allowed, and restricting the lane change assist in the direction away from the preset location when the lane return is not allowed.

4. A driving assist device comprising:
   a controller that executes driving assist control in which a target route is generated and in which a lane change assist is preformed that assists in a lane change based on the target route,
   the controller including:
   a lane change execution determination part that determines whether or not a lane change has been executed;
   a lane change determination part that determines whether or not the lane change is in a direction toward a preset location due to a driver's operation upon the lane change execution determination part having determined that the lane change has been executed;
   an index value determination part determines that whether or not a position index value from the host vehicle to the preset location is equal to or less than a first threshold value upon the lane change determination part having determined that the lane change is in the direction toward the preset location due to the driver's operation; and
   an assistance control part that restricts the lane change assist in a direction away from the preset location upon the index value determination part having determined that the position index value is equal to or less than the first threshold value.

* * * * *